United States Patent
VandenDolder et al.

(10) Patent No.: US 6,246,381 B1
(45) Date of Patent: *Jun. 12, 2001

(54) INSERT MOLD PROCESS FOR FORMING POLARIZING GRID ELEMENT

(75) Inventors: Ronald A. VandenDolder, Sunderland; George D. Winslow, Greenfield, both of MA (US)

(73) Assignee: Telaxis Communications Corporation, South Deerfield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/346,425

(22) Filed: Jul. 1, 1999

(51) Int. Cl.$^7$ ..................................................... H01Q 15/14
(52) U.S. Cl. .......................... 343/912; 343/755; 343/872; 29/600
(58) Field of Search ..................................... 343/753, 755, 343/872, 907, 908, 909, 912, 916; 29/600, 601

(56) References Cited

U.S. PATENT DOCUMENTS

| | | | |
|---|---|---|---|
| 3,574,258 | * | 4/1971 | May ...................................... 343/909 |
| 4,185,287 | * | 1/1980 | Hubing et al. ........................ 343/872 |
| 4,387,377 | * | 6/1983 | Kandler ................................ 343/909 |
| 4,482,513 | * | 11/1984 | Auletti ................................. 343/909 |
| 4,632,798 | | 12/1986 | Eickman et al. ................. 264/272.17 |
| 4,937,425 | * | 6/1990 | Chang et al. ......................... 343/909 |
| 5,455,589 | * | 10/1995 | Huguenin et al. ................... 343/753 |
| 5,680,139 | * | 10/1997 | Huguenin et al. ................... 343/753 |
| 5,688,575 | | 11/1997 | Sheer et al. ............................ 428/76 |
| 6,006,419 | * | 12/1999 | Vandendolder et al. ............. 343/912 |
| 6,014,108 | * | 1/2000 | Lynch et al. ......................... 343/755 |
| 6,075,492 | * | 6/2000 | Schmidt et al. ..................... 343/753 |

* cited by examiner

Primary Examiner—Hoanganh Le
Assistant Examiner—Thuy Vinh Tran
(74) Attorney, Agent, or Firm—Hamilton, Brook, Smith & Reynolds, P.C.

(57) ABSTRACT

A technique for manufacturing a domed housing, including a transreflector element for use in a microwave antenna. The dome incorporates a metallic polarizing grid as part of a complex curved shape using an insert mold process. As a result, the transreflector component can be inexpensively formed as an integral part of the supporting structure and any alignment features, without the need for additional molding steps or multiple component parts.

12 Claims, 3 Drawing Sheets

INSERT MOLD PROCESS FOR FORMING POLARIZING GRID ELEMENT

BACKGROUND OF THE INVENTION

New applications continue to be developed for radio signaling in the microwave and higher frequency ranges. For example, certain scanning radar systems operating in the range of 77 GigaHertz (GHz) can provide collision warning and avoidance information for controlling motor vehicle traffic. In such a system, moving and stationary obstacles in front of the vehicle are detected by the radar system. Post-processing modules analyze the radar data and, when necessary, the driver is alerted. In critical situations (when driver reaction is too slow), such systems can also be used to automatically apply the brakes. Other developed technologies in this area relate to adaptive cruise control of vehicle systems, which adapt the speed and distance of a vehicle to a preceding vehicle. The required functionality and reliability of such systems can typically be met through a combination of Monolithic Microwave Integrated Circuit (MMIC) based radar front-end electronics, and advanced antenna and signal processing for horizontal and vertical resolution, and microprocessor-implemented modules for evaluation of risk of collision, and strategies for informing the driver and braking the vehicle.

Other emerging applications for microwave signalling include the implementation of wireless data transmission systems. Such systems hold the promise of reduced network build out costs, especially in areas where telephone cable and high speed fiber optic lines are not available. Indeed, certain radio bands have already been dedicated to provide so-called Local Multipoint Distribution Service (LMDS) using high frequency microwave signals in the 28 or 40 GHz band. In the typical LMDS system, a hub transceiver services several different subscriber locations located within a given area, or cell, approximately up to six miles in diameter.

The implementers of vehicle radar, data transmission, and other microwave radio systems continue to be faced with several challenges at the present time. One challenge is in the electronics technology needed to implement these systems. Transceiver components must provide precise control over signal levels in order to effect the maximum possible link margin at the receiver. In addition, these systems must typically use a highly directional (i.e., narrowly focused) antenna that has very low cross polarization levels. The transceiver equipment, including the antenna, also typically needs to be small, compact, and light weight.

These requirements have led to the use of antennas for both LMDS service and microwave radars that use a so-called folding optics design. Such a design uses a device known as a transreflector placed in a plane orthogonal to the intended axis of the antenna and a twist reflector assembly also placed in the same plane. This type of antenna typically requires fabrication of multiple individual components. See, for example, the antennas described in U.S. Pat. No. 5,455,589 issued to Huguenin, G. R. and Moore, E. L. on Oct. 3, 1995 and assigned to Millitech Corporation, the assignee of the present application, as well as U.S. Pat. No. 5,680,139 issued on Oct. 21, 1997 to the same inventors, also assigned to Millitech Corporation.

Generally, the transreflectors used in these designs are fabricated as a structure with a curved surface on which a grid of fine parallel wires is disposed at closely spaced intervals. The interval spacing depends upon the frequency of the radio energy expected to be transmitted or received by the antenna. The grid serves as a polarizer for electromagnetic radiation, and the convex surface functions as a focusing reflector for the component of radiation having a polarization parallel to the wires.

Various techniques have been employed to manufacture such transreflectors. These techniques have generally involved a tedious and difficult alignment of wires along a closely spaced grid or other techniques for removing metal to leave a grid of finely spaced conductors. However, it is essential to the optimum operation of the transreflector that the conductive strips be absolutely parallel and uniformly spaced at small intervals. Precision alignment and spacing is often difficult to obtain with such procedures and achieving the required degree of precision economically is quite difficult. It is also desirable that such antennas be manufactured from low cost materials, using low cost processes as much as possible.

SUMMARY OF THE INVENTION

Briefly, the present invention is a process for manufacturing a compact, light weight, inexpensive transreflector element for use in an antenna. In its finished form, the antenna consists of an exterior shaped housing, or dome, formed of an inexpensive resilient material such as plastic. A polarizing metal grid is formed along an interior surface of the dome or within the internal surface of the dome.

More specifically, the process begins with a thin flat sheet of a suitable film substrate. The film may, for example, be Lexan™ or another polycarbonate. A conductive grid defining the electromagnetic properties of the transreflector is then laid down on the film such as by screening a conductive an ink grid. The sheet is then formed to the desired dome shape such as by vacuum forming it over a suitably shaped mold while applying heat. The formed shape is then trimmed to size.

In the final steps of the process, the formed part is then inserted into an injection mold die. the injection mold defines the ultimately desired external shape for the transreflector dome. Thermoplastic resin or other suitable material for forming the dome is then injected directly against the film while it is in the die. As a result, the film becomes an integral part of the molded transreflector assembly.

Several film constructions may be used. In the preferred embodiment, the screened film consists of the wire grid layers screen printed on the outer surface of the film, with a protective hard coat layer formed over the printed wires. The hard coat layer gives wear and chemical protection to the grid lines.

Other techniques may involve multiple film layers with a top layer screened on either a first or second surface and a second layer then being bonded to the first using a heat activated adhesive. In this instance, the second film layer can be used to protect the surface having the wire grid molded thereon from the later melt process during the injection molding resin step.

The present process has several advantages over other techniques. One significant advantage of this method is the ability to incorporate the metallic grid as a part of the complex dome shape without additional processes. The metallic grid is screen printed using inks, and a number of known processes can be used to obtain the desired high accuracy. This process also permits the transreflector to be formed as an integral part together with any supporting structure or alignment features as well. Finally, the process results in a low cost transreflector with minimal component part counts.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
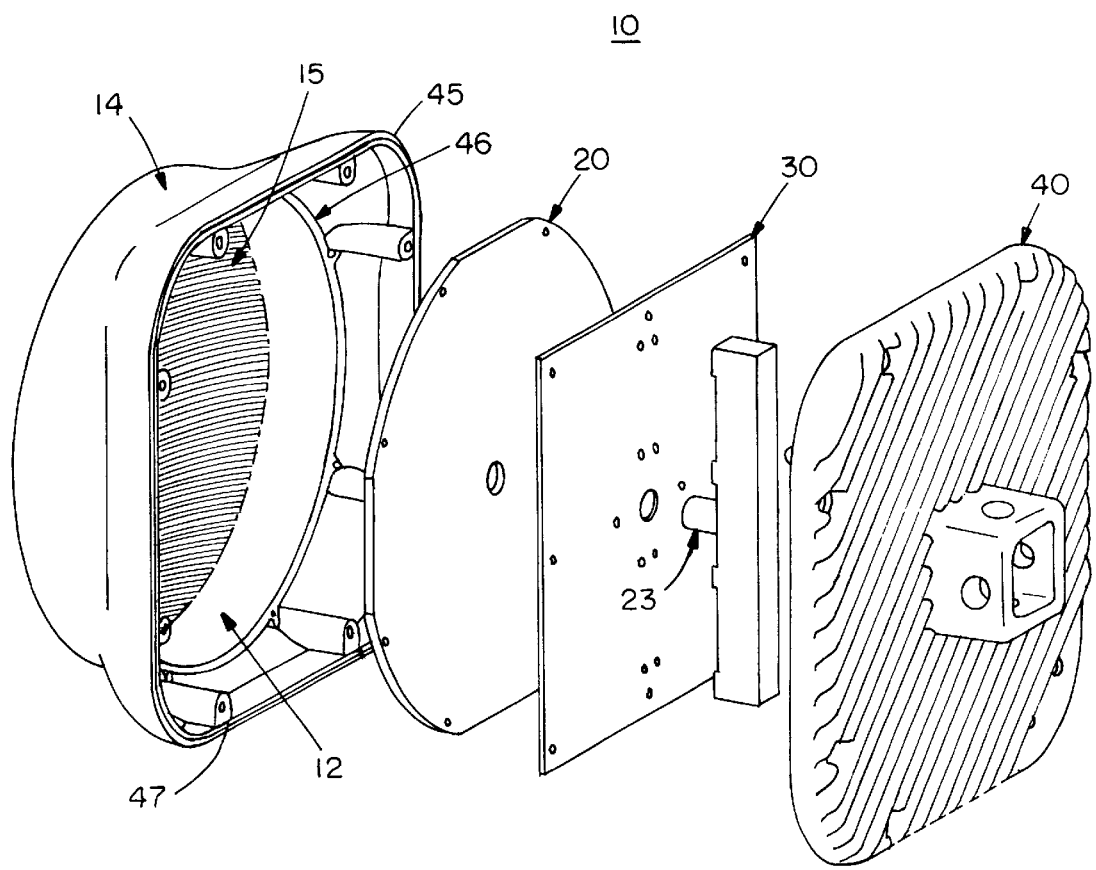
FIG. 1 is an exploded isometric view of a microwave antenna assembly that includes a transreflector manufactured according to the invention.

FIG. 1 is an isometric view of an antenna assembly 10 of which certain portions are manufactured according to the present invention. In particular, the antenna assembly 10 consists of a main body or housing 12 formed of an appropriate suitable material such as an ABS thermoplastic.

The housing 12 has an outer portion thereof shaped as a thin plastic dome 14. the dome 14 has an approximately parabolic shape in the preferred embodiment. An alternative shape for the dome 14 is spherical. As will be described in more detail below, the dome 14 has formed therein, on preferably an interior surface thereof, a parallel wire grid 15. In a preferred embodiment, the thickness of the dome 14 is approximately one-half of the wave length of the frequency of operation within the dielectric material of the dome 14.

The second component of the antenna assembly 10 is a twist reflector or plate 20. The twist plate 20 imparts a 90° rotation to electromagnetic energy in the polarization of the incident and reflected signals. The twist plate 20 may be designed in many different ways; in the illustrated embodiment, the twist plate 20 has formed thereon a grooved conductive surface (not visible in FIG. 1) facing the interior of the housing 12. A circular wave guide feed 23 is coupled to the center of the twist plate 20 and serves as a focal point for the received radiated energy and as a feed point for transmitted radiated energy.

The twist plate 20 typically also has mounted adjacent to the rear surface thereof a printed wiring board 30 on which are placed the components of a radio transceiver. A rear cover 40 serves as both a conductive shield against interfering electromagnetic radiation and as a shield against the weather and other physical elements.

It can be appreciated that the dome 14 and more specifically the grid 15 define a central axis or line of sight axis for the antenna. The specific arrangement of the grid lines 15 and the specific shape of the dome 14 are therefore critical as to orient this center axis properly.

Figure 2:
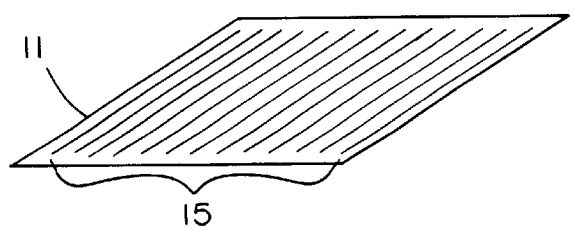
FIG. 2 illustrates a polycarbonate sheet and grid lines screened thereon.

Turning attention now to FIGS. 2 through 5, an initial series of steps used to manufacture the housing 12 incorporating the dome 14 and grid lines 15 will be described in detail. In a first part of the process, shown generally in FIG. 2, a thin sheet or other carrier film 11 is coated with a pattern of conductive material as a series of parallel spaced lines in order to form the conductive grid 15. The conductive lines (or "strips") may be formed with conductive ink through any number of decorative ink printing processes, or by vacuum depositors, etchings, and the like. In the case of etching, a metallic layer is first laid down upon the carrier film 11. Although a single sheet is shown in FIG. 2, it should be understood that at this point the carrier film 11 may also be formed from multiple sheets held together with adhesive coatings.

The preferred carrier film 11 is a thin polycarbonate sheet film such as Lexan™. However, other metalizable films may be utilized.

By using carrier film 11 as a base for defining and providing the structure for the grid 15, the conductive metal strips can be formed with a high degree of precision through a printing process using conductive ink containing metallic particles or by vapor deposition of a metal through a mask. Precision procedures for so doing are well known in the industry and readily adapted for forming the grid lines 15.

Figure 3:
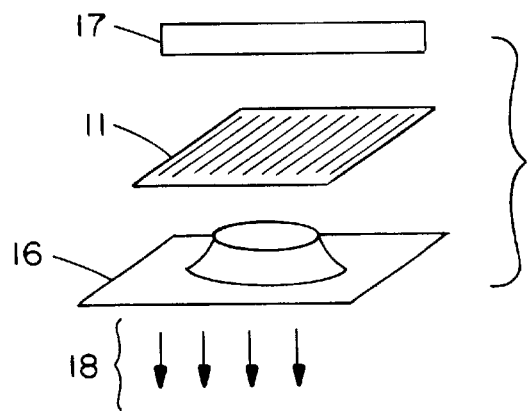
FIG. 3 illustrates a forming step.

As seen in FIG. 3, the carrier film 11 is then subjected to a vacuum forming process. In this step, the carrier film 11 is placed adjacent to a mold 16 having the desired shape for the finished dome 12. A heat source 17 is applied adjacent to the mold 16 and a vacuum is created to cause the film to warp to the desired shape.

Figure 4:
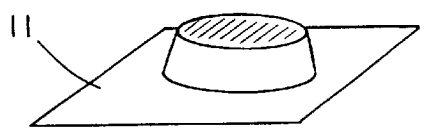
FIG. 4 shows a formed insert part.
Figure 5:
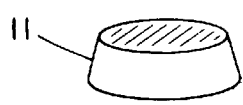
FIG. 5 shows the formed insert after it has been trimmed.

The process results in a molded sheet such as shown in FIG. 4; the molded sheet is then trimmed to provide the ultimate desired shape of the dome 12 as shown in FIG. 5.

Figure 6:
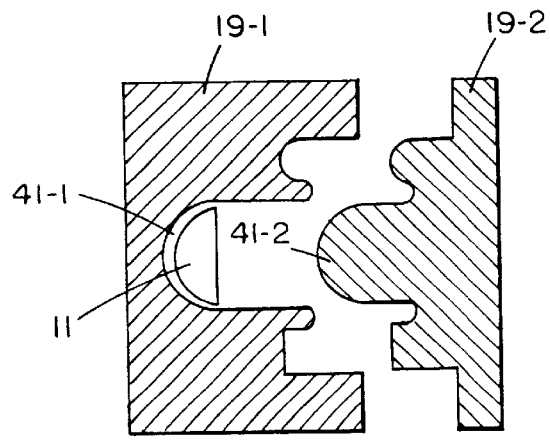
FIG. 6 illustrates the empty injection mold with the formed insert placed therein.
Figure 7:
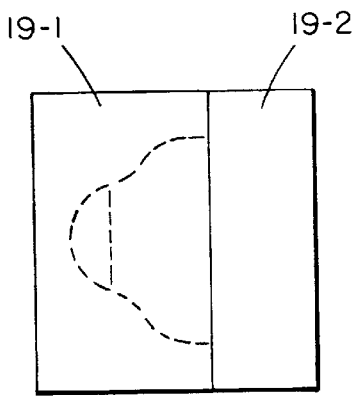
FIG. 7 shows the closed mold with thermoplastic resin flowing around the formed insert.
Figure 8:
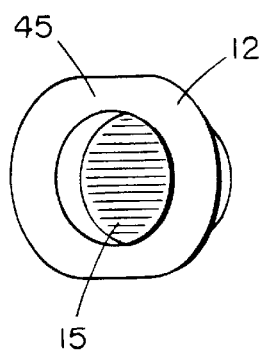
FIG. 8 shows the completed transreflector dome.

FIGS. 6 through 8 illustrate the final steps in manufacturing the dome 12. As shown in FIG. 6 in particular, the formed carrier film 11 is then inserted into an injection mold containing two halves 19-1 and 19-2. The injection mold halves 19-1 and 19-2 have corresponding curved surfaces 41-1 and 41-2 conforming to the ultimate desired shape of the dome 12.

The mold halves 19 are then clamped to one another as shown in FIG. 7 with the carrier film 11 placed there between. A suitable molten thermoplastic resin or other suitable resilient material for forming dome 12 is then injected into the mold using an injection molding machine. The molten resin flows through the cavity in the mold 19 against the formed carrier film 11.

Subsequently, the mold halves 19 are opened and the transreflector dome element 12 is removed therefrom. The pattern of conductive material, specifically the grid lines 15, are now transferred and indeed have become an integral part of the inner concave surface of the dome 12. As best shown in FIG. 1, a retaining ring 45, a circular lip portion 46, mounting screw posts 47, and other supporting structures or alignment features may be defined by the injection mold and integrally formed with dome 12 if desired.

The thermoplastic resins for forming the body of the dome 12 may include polycarbonates, polymethyl methacrylate, ABS, polyethylene, terephtlate and polybutylene terephtlate, and their alloys. In general, higher melt temperature engineering resins are not desirable for use in the present process.

As can be seen now from the foregoing detailed description and drawings, the method of the present invention is effective in providing a high degree of precision in forming the fine lines which must be used to create the parallel wire grid 15. The ink mold process allows transfer of the conductive lines using well known screen printing techniques.

The synthetic resin body of the transreflector is easily formed about the carrier film using known injection molding techniques and results in good bonding of the two materials as part of the molding process. As a result, transreflector antenna assemblies 10 may be produced at a relatively low cost with a high degree of accuracy.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for manufacturing a transreflector comprising the steps of:

depositing on one surface of a carrier sheet a series of spaced parallel strips of a conductive material;

forming a shape for such sheet about the surface of a mold, the mold defining a desired curvature for the transreflector;

placing such formed sheet within an injection mold with the injection mold defining a desired shape for a transreflector dome; and introducing a fluid synthetic resin into said is injection mold to form the transreflector dome with said sheet becoming an integral part of the transreflector dome.

2. A method as in claim 1 additionally comprising the step of:

removing excess sheet material after the step of forming the shaped sheet.

3. A method as in claim 1 wherein each of the conductive strips comprises a multiplicity of closely spaced lines of conductive material.

4. A method as in claim 1 wherein the conductive material is metallic ink.

5. A method as in claim 1 wherein the carrier sheet is a polyester resin.

6. A method as in claim 5 wherein the fluid synthetic resin is a low loss, low dielectric constant polymer selected from the group consisting of polyesters, polymethyl pentenes, polyacrylates, and styrene interpolymers.

7. A method as in claim 1 wherein the transreflector is of a generally circular peripheral configuration.

8. A method as in claim 1 wherein the step of depositing the conductive material on the carrier sheet comprises depositing an ink having conductive particles therein.

9. A method as in claim 1 wherein the conductive material is vacuum deposited metal.

10. A method as in claim 1 wherein the conductive pattern is printed and etched from pre-clad or plated material.

11. A method as in claim 1 wherein the step of forming a shape for the sheet additionally comprises a step of vacuum forming the sheet.

12. A method as in claim 1 wherein the step of forming a shape for the sheet additionally comprises the step of heating the sheet.

* * * * *